Feb. 13, 1968  R. A. HOWELL  3,369,118
HOT BOX DETECTION MEANS AND METHOD
Filed March 29, 1965  2 Sheets-Sheet 1
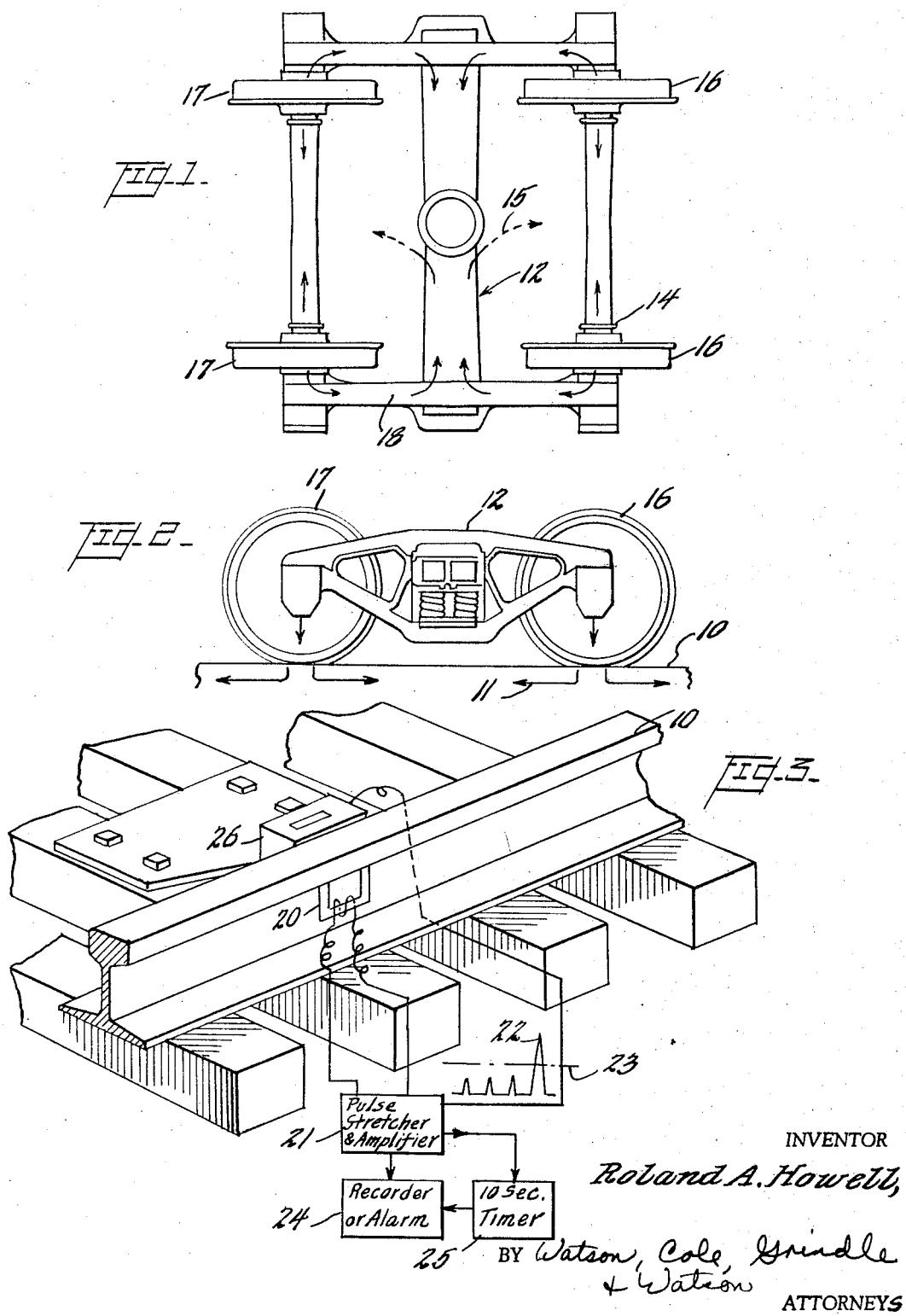
INVENTOR
Roland A. Howell,
BY Watson, Cole, Grindle
    & Watson
ATTORNEYS Feb. 13, 1968   R. A. HOWELL   3,369,118
HOT BOX DETECTION MEANS AND METHOD
Filed March 29, 1965   2 Sheets-Sheet 2
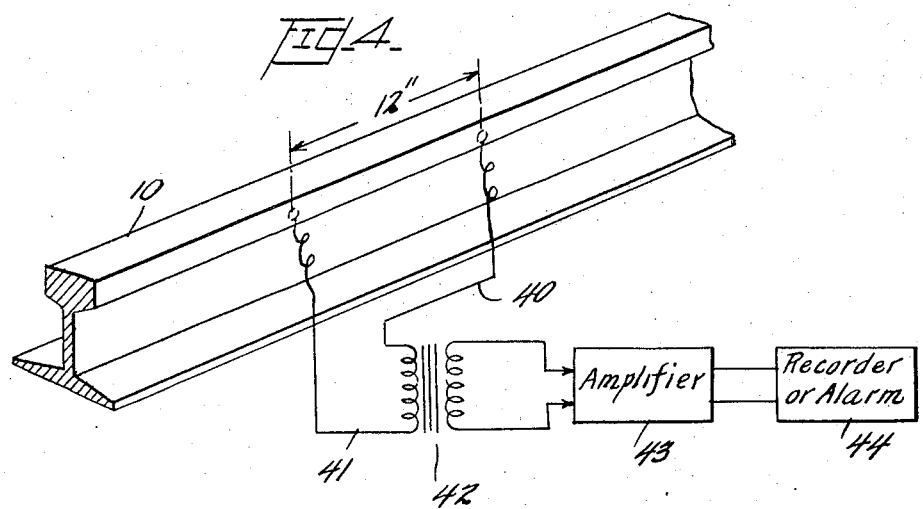
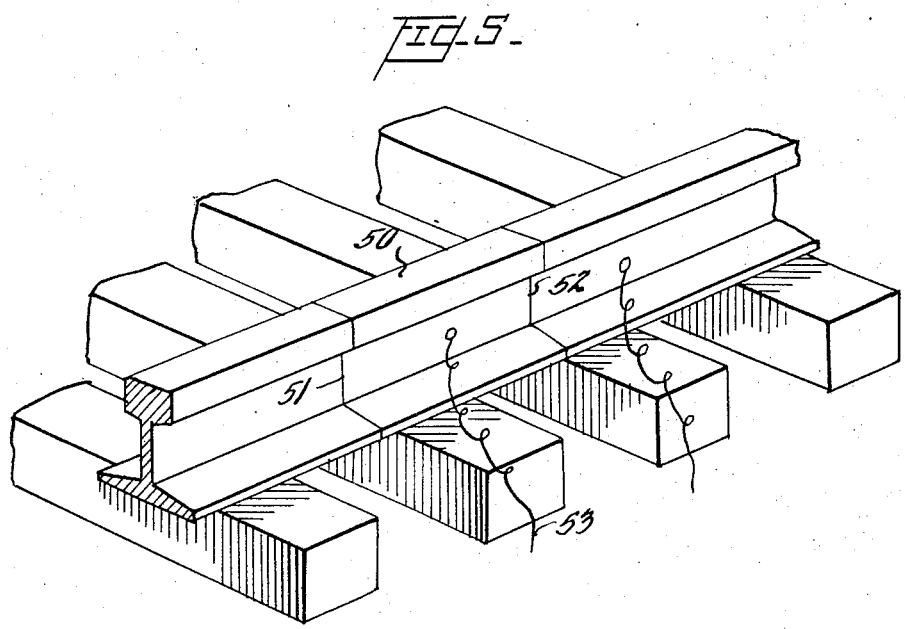
INVENTOR
Roland A. Howell,
BY Watson, Cole, Grindle & Watson
ATTORNEYS ative coil 20 which introduces in the pulse stretcher and
United States Patent Office 3,369,118
Patented Feb. 13, 1968

3,369,118
HOT BOX DETECTION MEANS AND METHOD
Roland A. Howell, 3814 Woodbrook Drive,
Chattanooga, Tenn. 37406
Filed Mar. 29, 1965, Ser. No. 443,228
5 Claims. (Cl. 246—169)

ABSTRACT OF THE DISCLOSURE

The presence of overheated bearings in railway cars is detected by measurement of thermoelectric currents that are induced at the junction between the hot brass bearing materials and the like and the cooler steel frames and which will pass through the rails. Detection of current flow, induced currents or potentials in the rails will provide a signal which increases disproportionately as the bearing temperature increases.

---

This invention relates to apparatus and methods for detecting hot boxes on moving railway trains.

Heretofore various methods have been proposed of detecting heat radiated from overheated wheel bearings on moving railway trains. However since most of these devices have been sensitive to auxiliary heat sources many problems were introduced, such as heat generated from the engine motors, refrigerator car heaters, and other bodies which had to be distinguished from the detection of a hot box.

Therefore it is an object of the present invention to detect hot boxes by a novel method which is insensitive to other heat generation sources.

It is a general object of the invention to provide improved methods and apparatus for detecting overheated wheel bearings on moving railway trains.

Thus in accordance with the present invention the thermoelectric effect which is introduced at the bearing surfaces by heating at the junction of steel and babbit metal and brass or brass and steel is detected. The bearing materials are heated by the friction at the bearing assembly and the resulting thermoelectric current significantly increases as the temperature goes up in an overheated bearing. This thermoelectric effect creates a current flow which will travel through the train carriage and into the rails where it can be detected with a current detecting device located at a detection point along the rail. In this manner therefore the overheated wheel bearings are detected and other sources of heat such as the engine or a heater in a railroad car do not provide an associated current effect in the rails.

This method of operation is explained in connection with various embodiments with reference to the accompanying drawings, wherein:

FIGURE 1 is a sketch of a railroad car undercarriage with arrows indicating direction of thermoelectric current flow inherent therein as the wheel bearings are heated;

FIGURE 2 is a sketch showing the manner in which this current flows through the rails;

FIGURE 3 shows in perspective a detector at a detection position along the rail and shows the detection system in block diagram form;

FIGURES 4 and 5 show alternative methods of detecting current flow in the rail at the detector station.

It may be seen by reference to FIGURES 1 through 3 that a current flow is introduced into the rail as indicated by arrows 11 flowing from the undercarriage 12. This current is induced at the wheel bearings 14 because of the thermoelectric effect generated even during normal frictional heating to exist between the differing bearing materials which may be babbit or brass and the axle journal which is steel. This thermoelectric effect becomes significantly more pronounced as the bearings are heated up to a dangerous degree. The current flow will seek its various paths of return as indicated by arrows in the undercarriage assembly and will even seek to pass out of the undercarriage through paths in the rail car itself as indicated by the arrows 15. However, because of the relative very low impedance through the rails 10 a significant amount of the current will tend to flow between the pair of wheels 16 and 17 through the intervening track section 10. It is this current flow which a detector assembly of FIGURE 3 is designed to detect in order to determine whether the wheel bearings are overheated.

In essence the current flow is picked up by an inductive coil 20 which introduces in the pulse stretcher and amplifier circuit 21 pulse signals in response to the passing of each carriage assembly in a moving train such as shown in waveform 22 which represent pulses of different amplitudes to indicate normal undercarriages passing over the detection station and an abnormally high potential pulse. As seen by the amplitude of the pulses in waveform 22, they normally reside below the threshold level 23 unless the bearing is overheated. Thus the highest amplitude pulse waveform would be indicative of an overheated wheel bearing, whereas the remaining pulses are indicative in general of normally heated bearings. Thus a threshold detecting device in the amplifier circuit 21 can actuate a recorder or alarm circuit 24, or the recorder 24 may be used alternatively to record all the pulses in sequence at the time the train is passing. In order to prevent the recorder from running continuously, the ten second timer device 25 is installed for actuation by a wheel axle detector 26 which may be a conventional magnetic detector switch. Thus the device will only record or provide an alarm during the time in which a train is passing over the detection position, and the recorder is only used during the pertinent periods to indicate the condition of the wheel bearings.

Since the span of current flow in the track is dependent upon train speed, the pulse stretcher circuit 21 provides for holding the pulses developed long enough when high speed trains tend to reduce pulse widths below that necessary for response and recording in the detector employed. The train then permits the low frequency responsive recorder 24 to indicate the wheel condition at any speed. The ten second timer 25 also serves to actuate the recorder only for a limited time after the presentation of an axle at the detection point. This records the group of signals for the entire train moving at reasonable speed and then shuts off the system until another train is sensed. Thus the controls on the detection device are extremely simple and need not take into account such complexities as the exclusion of the locomotive from a hot box detection system, but merely serves to detect the flow of current in the rail 10 during the passing of a train. This simplified approach is primarily possible because of the detection of thermoelectric current flow from the wheel bearings during the time period at which the train is passing the detection station.

The inductive device 20 is advantageous since it requires no electrical connections directly to the rails and is sensitive in picking up current flow signals. However it can introduce a signal amplitude component proportional to the speed of the train because of the rate of change of current flow in the rail. This under some circumstances could make the detector less sensitive to marginal heats, since the rate at which the pulses pass the detection point will vary as the function of the train speed and therefore will tend to give an amplitude increase for high speed trains which is not a function of temperature, and which may approach the threshold magnitude. When bearings are significantly overheated they present such a change in magnitude that this effect may be neglected however. In order to give a better indication of marginal bearings the speed component may be eliminated by employing the detective devices of FIGURES 4 and 5, which measure potential difference or current flow through the rail directly rather than inductively.

Thus the configuration of FIGURE 4 indicates the direct detection of current flow by affixing leads 40 and 41 to spaced positions along rail 10 to introduce signals into the primary winding of transformer 32 and into the amplifier circuit 43 and alarm circuit 44. It may be seen therefore that the magnitude of the thermal current flow sensed at the transformer 42 will be less sensitive to the speed of the train.

By putting an insulating cap over the rail or slicing a section 50 out of the rail and installing intervening insulating blocks 51 and 52 on either side thereof, the potential difference between one set of wheels and the other in the carriage may be determined by a signal introduced at leads 53. This will serve to detect the current flow within the carriage frame itself which sets up a potential difference between the wheels positioned along the rail section 18 by undercarriage, as seen in FIGURE 1.

In any event it is seen by the novel methods of this invention that improved hot box detection may be afforded by detecting the thermoelectric current which is generated by overheated wheel bearings. Having therefore improved the state of the art, I therefore claim those novel features representative of the nature and scope of my invention as defined in the accompanying claims.

What is claimed is:
1. The method of detecting overheated wheel bearings of a railroad train that moves past a detection point comprising the steps of sensing signals excited in a rail by thermoelectric current flowing from the wheel bearings through the rail, and signifying such signals occurring at a level exceeding a predetermined threshold.

2. The method defined in claim 1 including the further step of sensing signals only for a limited time after presentation of an axle at the detection point.

3. The method defined in claim 1 including the further steps of retaining the sensed signal after expiration of and recording the signals produced during passage of the train responsive to the retained signal.

4. The method defined in claim 1 wherein current flow in the rail is sensed electromagnetically.

5. Apparatus for detecting a hot box in a moving train comprising in combination, means associated with a short rail section to sense signals therein induced by thermoelectric currents in a passing train carriage, and threshold means determining that magnitude of thermoelectric signals in the rail indicative of an overheated wheel bearing of a passing railway car.

No references cited.

ARTHUR L. LA POINT, *Primary Examiner.*
STANLEY T. KRAWCZEWICZ, *Examiner.*